June 14, 1932.  G. M. BARNES  1,862,918
SYSTEM OF FIRE CONTROL
Filed June 16, 1930   7 Sheets-Sheet 1
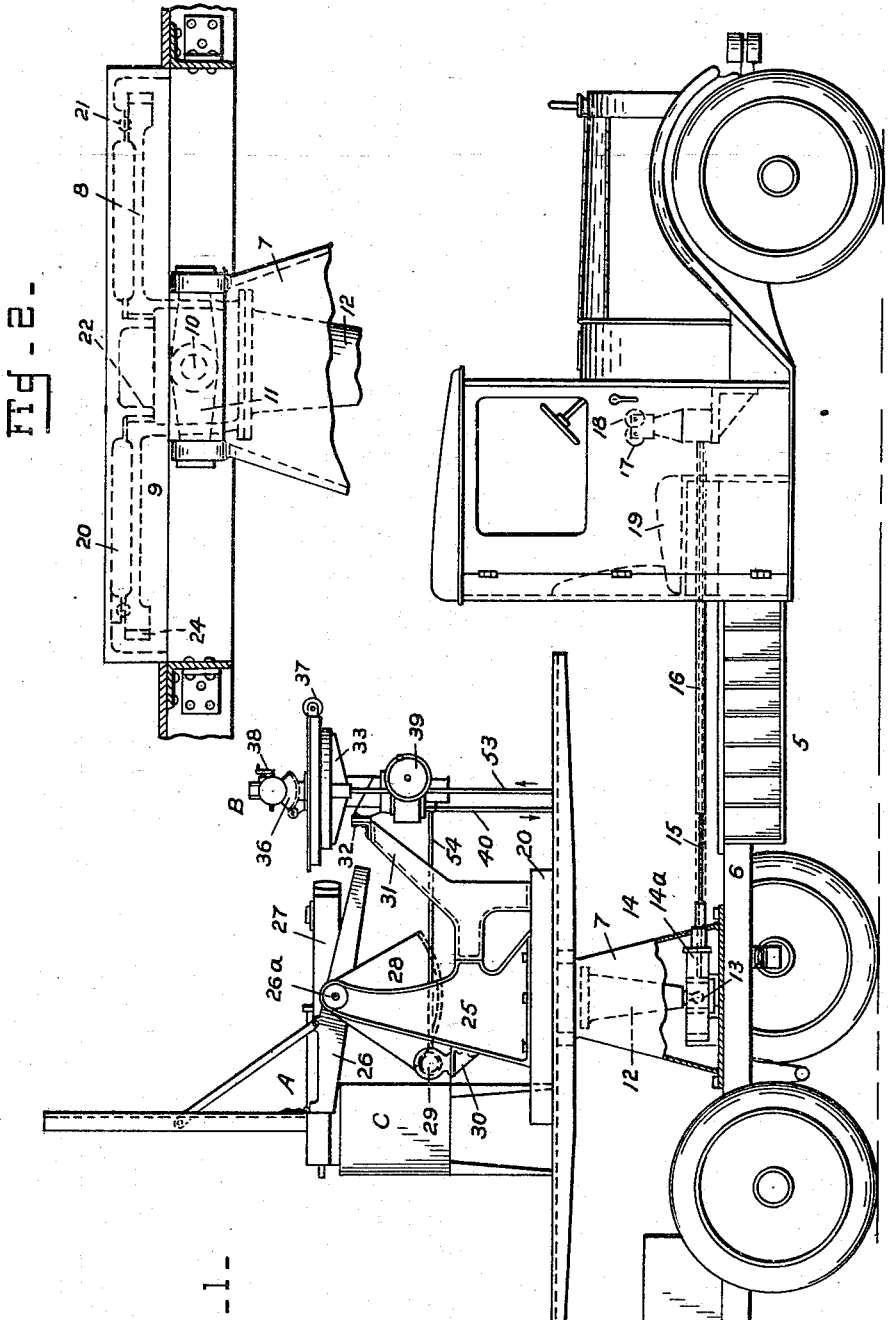
INVENTOR.
Gladeon M. Barnes
BY
ATTORNEY

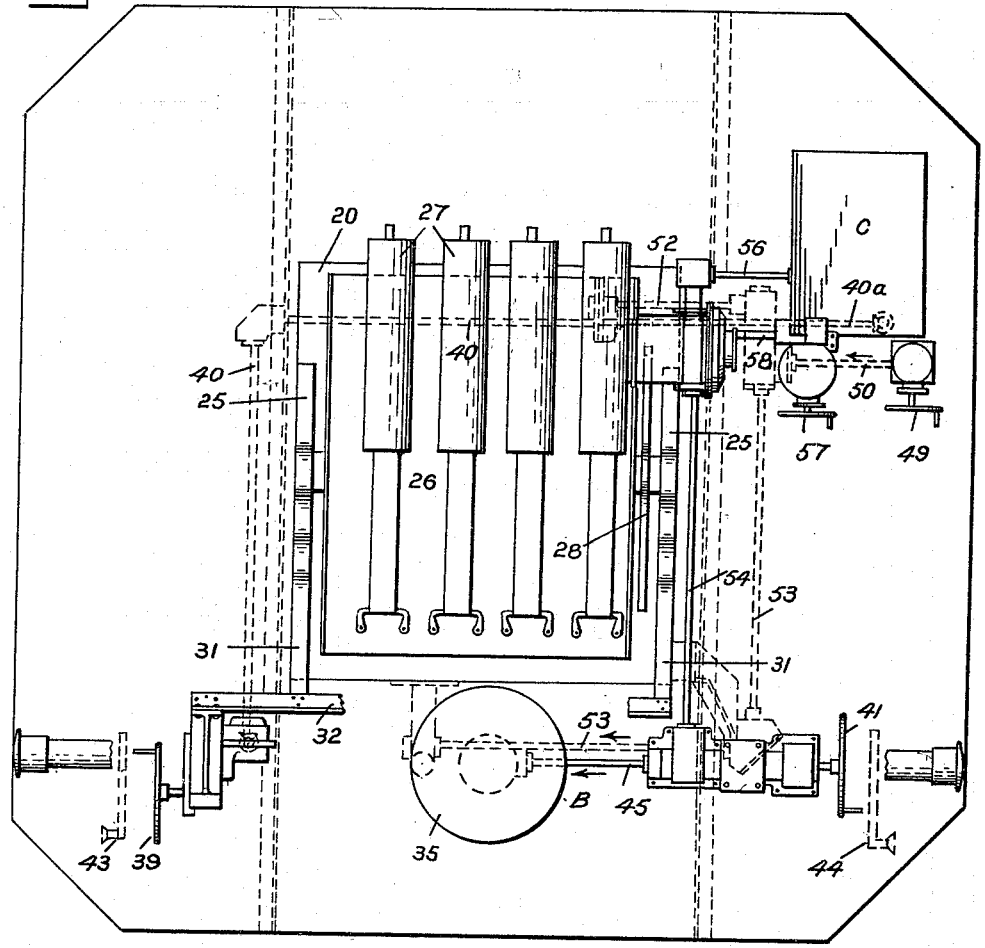
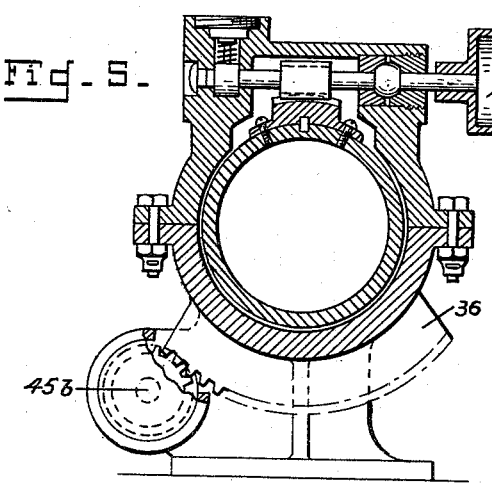

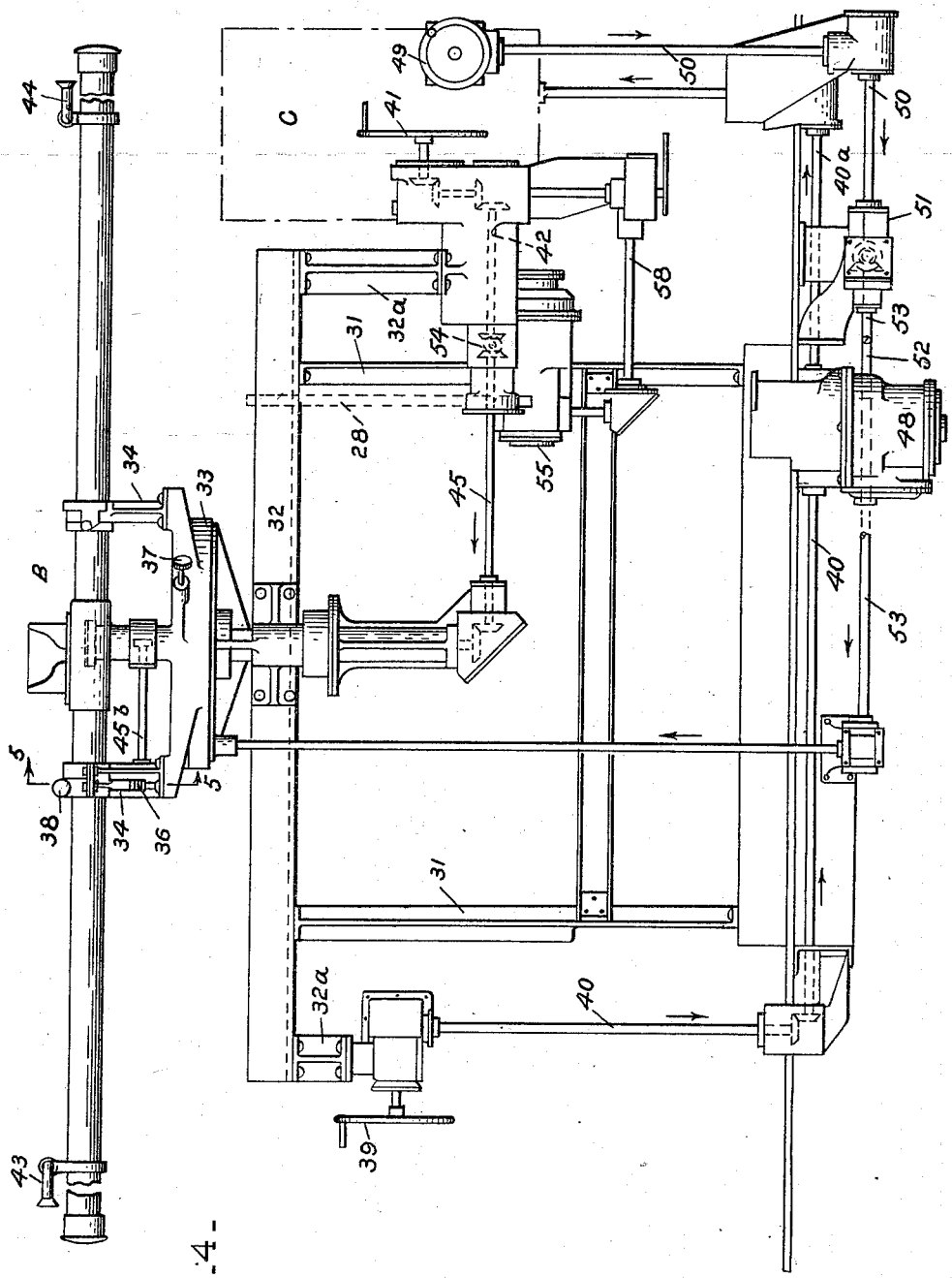

June 14, 1932.  G. M. BARNES  1,862,918
SYSTEM OF FIRE CONTROL
Filed June 16, 1930  7 Sheets-Sheet 4
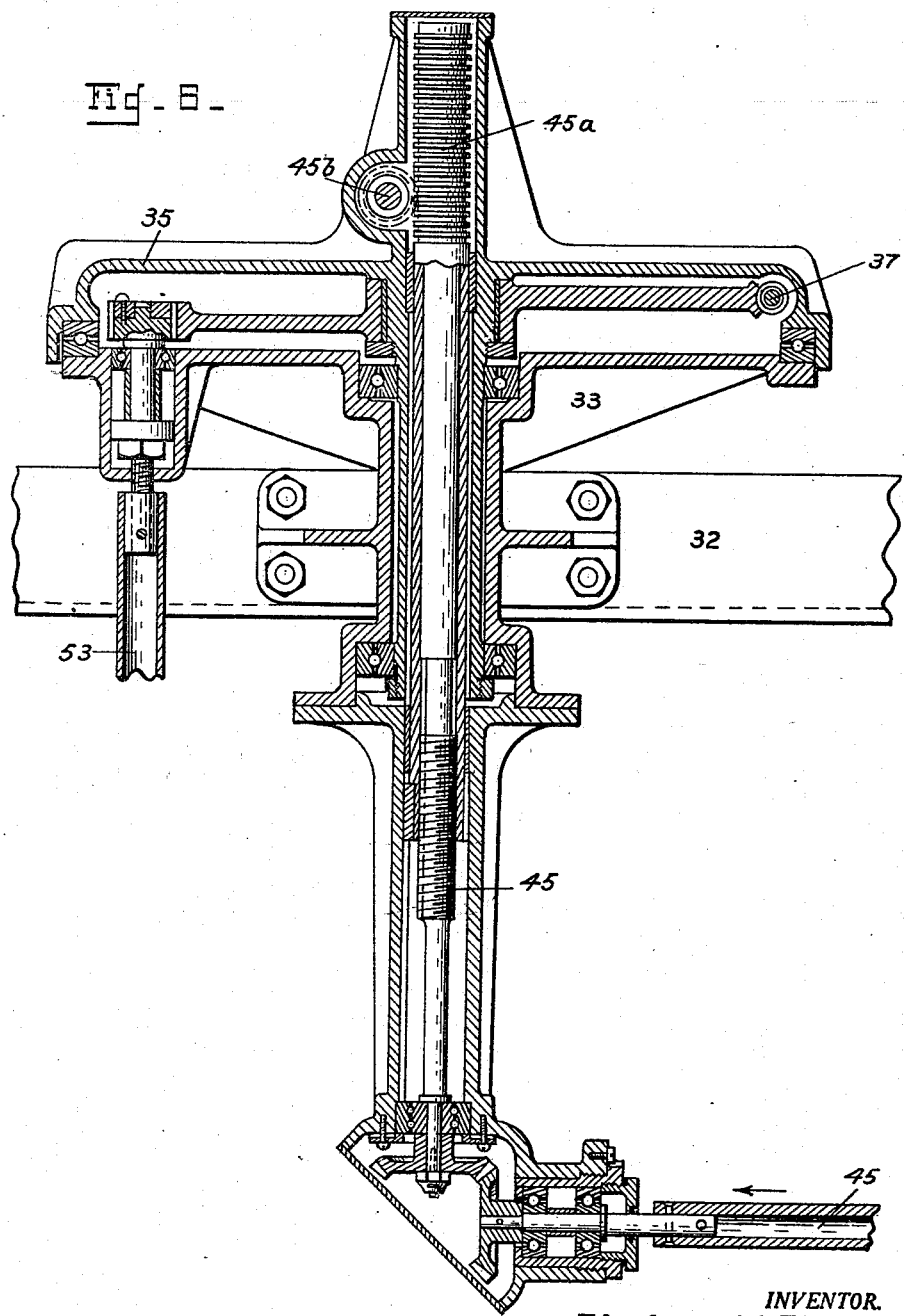
INVENTOR.
Gladeon M. Barnes
BY W. N. Roach
ATTORNEY

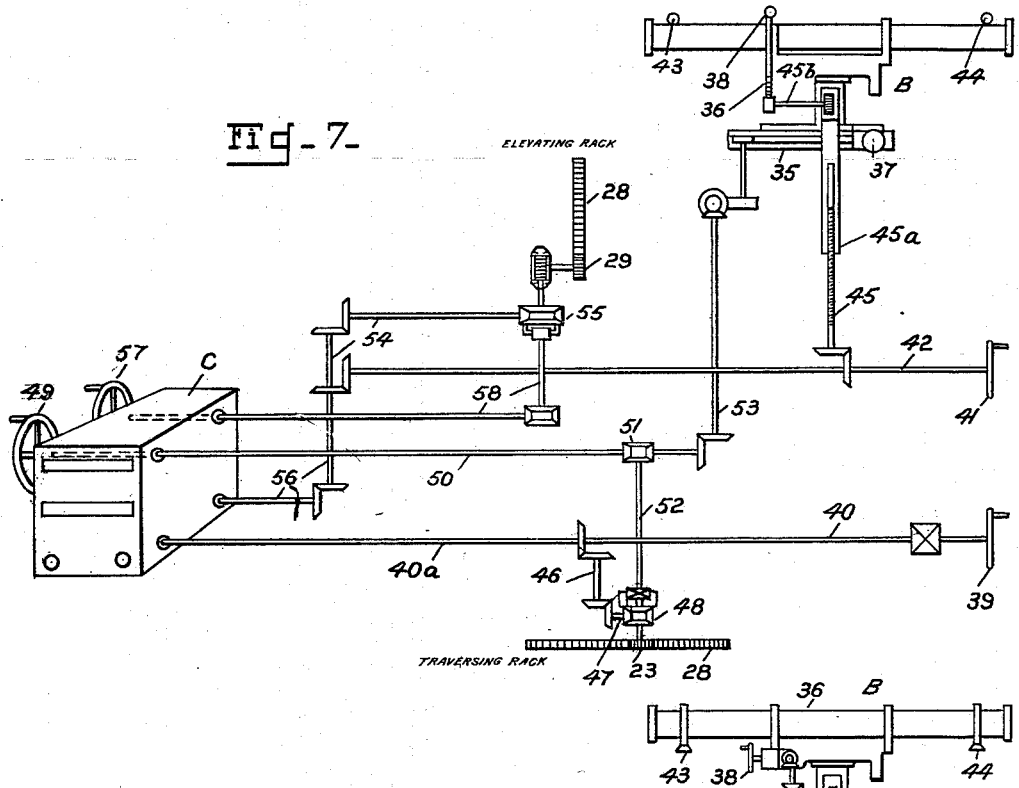
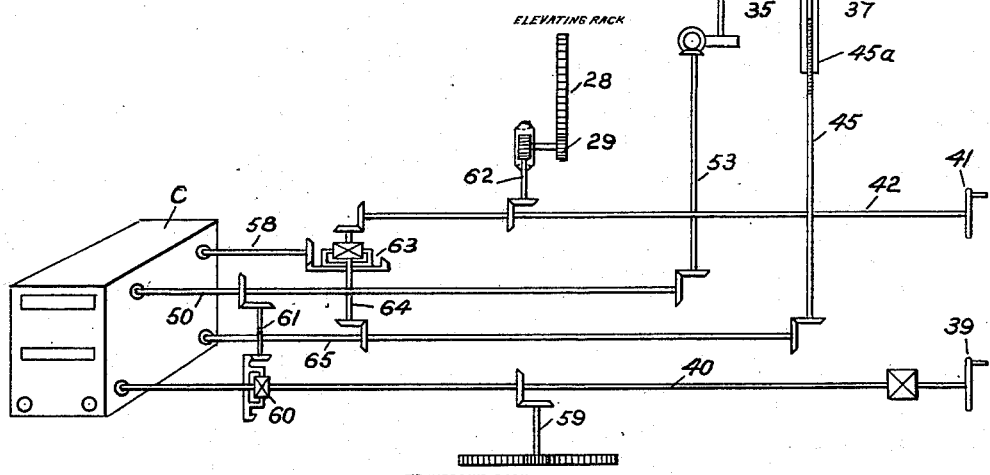

June 14, 1932.  G. M. BARNES  1,862,918
SYSTEM OF FIRE CONTROL
Filed June 16, 1930    7 Sheets-Sheet 6
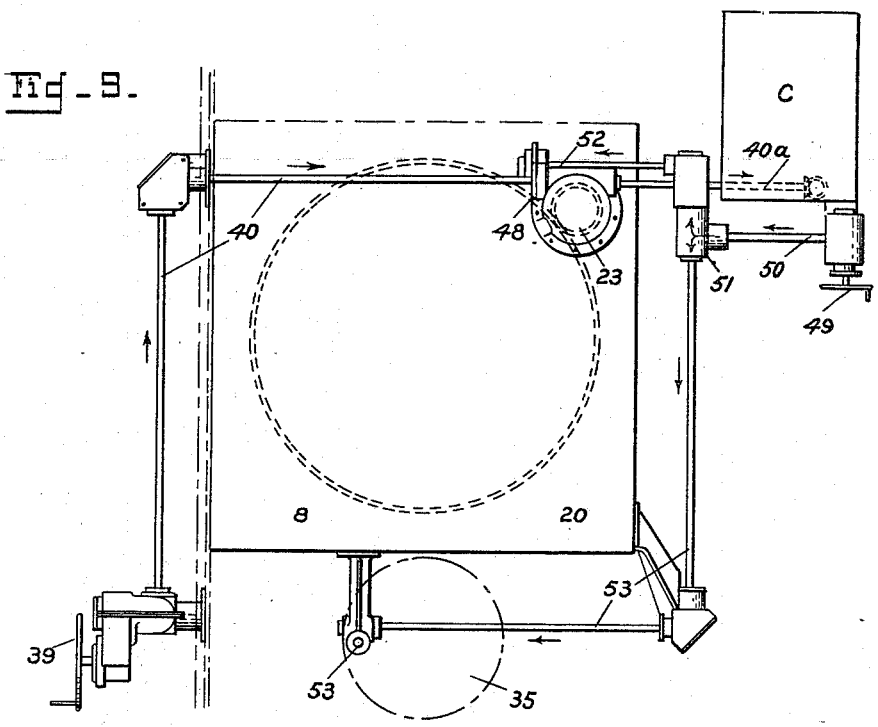
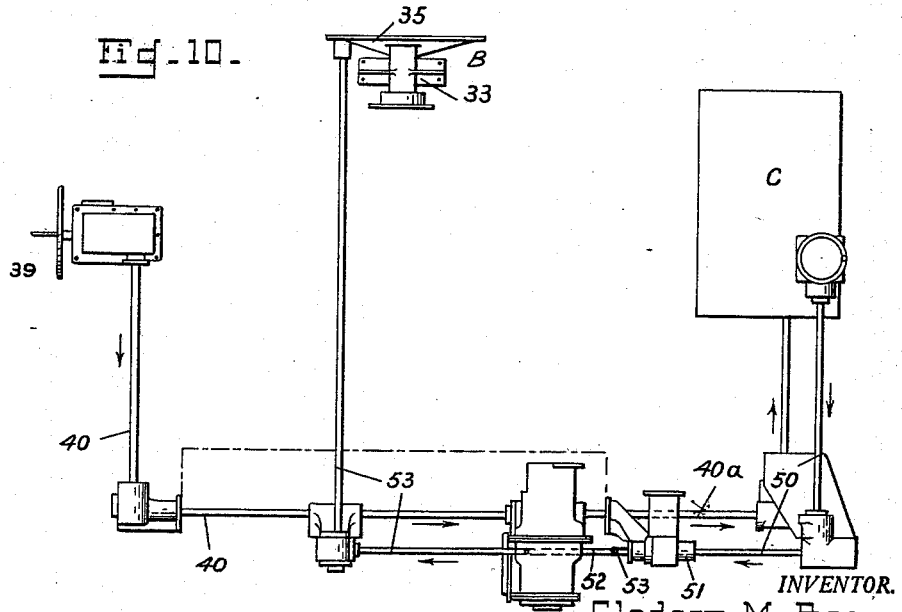

June 14, 1932.  G. M. BARNES  1,862,918
SYSTEM OF FIRE CONTROL
Filed June 16, 1930　　7 Sheets-Sheet 7
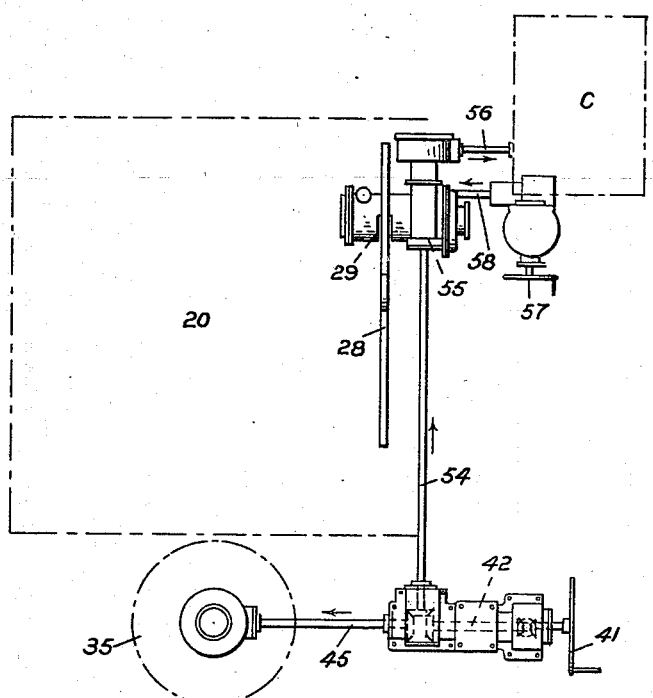
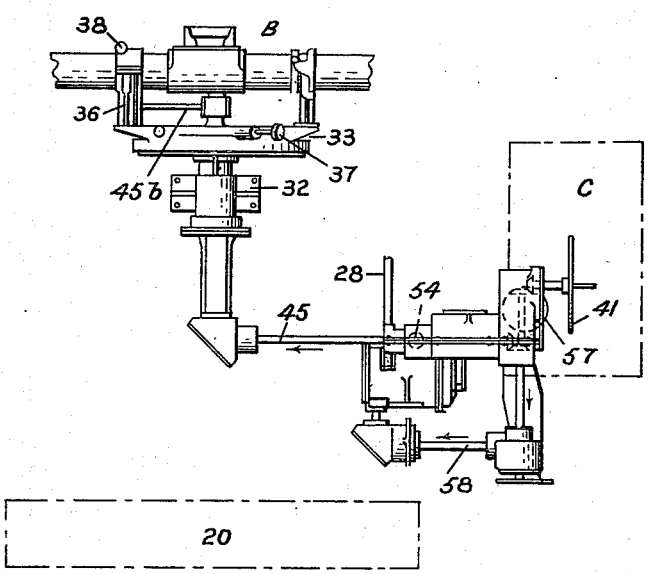
INVENTOR.
Gladeon M. Barnes
BY W. N. Roach
ATTORNEY Patented June 14, 1932

1,862,918

UNITED STATES PATENT OFFICE

GLADEON M. BARNES, OF HASTINGS, MICHIGAN

SYSTEM OF FIRE CONTROL

Application filed June 16, 1930. Serial No. 461,516.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to a system of fire control wherein a gun mount is associated in a novel manner with a stereoscopic telemeter and with a computer for determining lateral and vertical corrections. The various units are so interconnected that the tracking of the target through the telemeter operates through the computer to set the guns to the corrected lead in both azimuth and elevation.

This is accomplished by placing the computer and telemeter on a rotatable gun mount. A pair of telescopic sights for respectively following the target in azimuth and elevation are placed on the telemeter and the sighting operators in keeping the telescopes trained on the target operate the azimuth and elevation mechanism which moves the gun. This movement which is a measure of the angular rate of travel of the target in the prescribed plane is conducted into the computer where it affords a basis for determining the lateral and vertical deflection corrections which must be imparted to the gun to train it to the future position of the target; in other words, to place on the gun the proper lead. Where the gun is comparatively light, the generation of these correctional values may be directly utilized to move the gun to set in the lead but where the gun mount is too heavy to permit this operation, the correctional values are transmitted to the telemeter to angularly displace it relatively to the mount.

Since the telemeter is carried by the mount and will be moved with it during traversing, it is necessary in the first instance to compensate for the angular displacement by a reverse movement of the telemeter which has the effect of keeping the telemeter on the target. In the second instance, the telemeter will be moved off of the target and the operation of restoring it onto the target will move the mount through the angular distance corresponding to the lead.

The mount and the system of controlling is particularly applicable to antiaircraft firing with automatic weapons mounted on self-propelled vehicles capable of moving across country. In order that data may be obtained and the firing conducted while the vehicle is in motion, means are provided for maintaining the firing platform level at all times and under all circumstances.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation, parts broken away, of a gun mount embodying the improved system of fire control;

Fig. 2 is an enlarged view of the support connection between the traversing carriage and the pedestal;

Fig. 3 is a plan view of the gun mount;

Fig. 4 is a view in rear elevation of Fig. 3, the cradle and guns being omitted;

Fig. 5 is a detail sectional view on the line 5—5 of Fig. 4;

Fig. 6 is a longitudinal sectional view of the mount for the stereoscopic observing instrument;

Fig. 7 is a schematic view of the fire control system;

Fig. 8 is a schematic view of an alternate method of arranging the fire control system;

Figs. 9 and 10 are respectively views in plan and rear elevation of the physical embodiment of the azimuth control system of Fig. 7; and Figs. 11 and 12 are views similar to Figs. 9 and 10 of the elevation control system of Fig. 7.

Referring to the drawings by characters of reference:

In Fig. 1 there is shown a self-propelled vehicle 5 having the usual chassis 6 on which is secured a pedestal 7. As shown in detail in copending application Serial No. 427,903 of February 12, 1930, and accordingly only briefly referred to herein, a base plate 8 overlies the pedestal and has a depending portion 9 inserted within the pedestal. The portion 9 is journaled on a shaft 10 which passes at right angles through a cross shaft 11 trunnioned in the pedestal. Secured to the portion 9 is a spindle 12 having a universal connection 13 with a frame 14 slidable within a second frame 14a. The frames are movable at right angles to each other and are actuated through shafting 15 and 16, respectively controlled by hand wheels 17 and 18 positioned adjacent the operating seat 19 of the vehicle. This construction provides for leveling of the base plate 8 on the axes of the cross members 10 and 11 even though the vehicle is in motion.

The traversing carriage 20 of the gun mount A is supported through roller bearings 21 on the base plate and also through a central pintle 22 which maintains the carriage concentric with the base plate and takes up all lateral thrust loads. The carriage is rotated about the base plate 8 by means of the pinion 23 (see Fig. 7) meshing with the gearing 24 fixed on the periphery of the base plate.

The top carriage consists of spaced uprights 25 secured to the carriage 20. In the upper extremity of the uprights is trunnioned a cradle 26 carrying a plurality of machine guns 27 and provided with an elevating arc 28 adjacent the right hand upright and moved through a pinion 29 mounted on an arm 30 of the upright. The axis of the cradle trunnions 26a preferably intersects the axis of the traversing carriage.

Forming part of the top carriage are a pair of rearwardly extending brackets 31—31 (Figs. 1 and 4) secured to the uprights 25 and to the carriage 20. The extremities of the brackets are connected by a member 32 which centrally carries a mount 33 including spaced arms 34—34 supporting a telemeter B preferably of the stereoscopic type giving values of altitude. The axes of the instrument B are normally parallel to the axes of bore of the gun. The mount 33 includes a traversing plate 35 (Fig. 6) and an elevating segment 36 (Fig. 5) respectively actuated through the hand wheels 37 and 38 whereby the stereoscopic observer can independently control the instrument and move it relatively to the gun. The traversing and elevating arrangement is more or less conventional.

The member 32 (Fig. 4) connecting the brackets is extended laterally and has depending arms 32a carrying the mount traversing hand wheel unit 39 and shafting 40 and the mount elevating hand wheel unit 41 and shafting 42. Referring more particularly to Fig. 7, the shafting 40 and 42 is conducted respectively to the traversing pinion 23 and the elevating pinion 29 of the gun mount. The operators of the hand wheels 39 and 41 respectively sight on the target through telescopes 43 and 44 (Fig. 4) and by tracking the target they generate a movement proportional to the angular rate of travel of the target in the horizontal and vertical planes. Since the telemeter B is carried by the traversing gun carriage 20 and is normally parallel to the cradle trunnions, the operator of the handwheel 39 directly traverses the gun carriage and thereby maintains his line of sight through the telescope 43 on the target. Inasmuch as the instrument B is completely independent of the cradle 26 the movement in elevation through the handwheel 41 and shafting 42 must also be conducted to the instrument B through shafting 45, rack 45a, shafting 45b and elevating segment 36.

In this manner the axes of bore of the gun and the instrument are moved through the same vertical angular distance and will remain in parallelism.

The third component of the apparatus consists of a computer C secured to the traversing parts of the gun mount and preferably of a known type operating according to the angular travel method of fire control wherein the lateral and vertical deflections are determined by measuring the angular travels of the target laterally and vertically during one unit of time and by multiplying these values by the time of flight, the latter factor being a function of altitude and angular height. Provision is also made in a computer of this character for determining the superelevation due to range and for entering corrections due to the matériel, ballistic effects, and erroneous assumptions concerning the movement of the target.

With reference to the traversing parts the shaft 40 speed of rotation of which is a measure of the angular rate of travel of the target in the horizontal plane, leads directly into the computer through shafting 40a and through the shafting 46, 47, and differential 48 to the pinion 23 which causes movement of the gun carriage 20 in azimuth. The telemeter B which is mounted on the carriage 20 will therefore likewise move in azimuth and the telescope 43 and the guns on the cradle will, accordingly, be directed at the target in azimuth.

The handwheel 49 of the computer C generates a movement proportional to the total lateral deflection corrections which are to be applied to the gun carriage in order to lay the guns to the proper horizontal lead with respect to the target. This movement is transmitted through the shaft 50 to a differential gearing 51 whence it is led by shaft 52 to the differential 48 and traversing pinion 23. By virtue of the fact that the telemeter is mounted on the carriage 20 and will be affected by the horizontal lead applied to the carriage, shafting 53 is led from the differential 51 to the traversing plate 35 of the instrument whereby the instrument is moved horizontally in the reverse direction and by a corresponding amount so that the lateral deflection adjustment will not move the instrument off of the target.

Referring now to the elevating parts, the shaft 42, speed of rotation of which is a measure of the angular rate of travel in the vertical plane, transmits its motion to the elevating parts 36 of the telemeter through the shaft 45 and to the elevating rack 28 of the gun mount through shafting 54 and differential 55. The axes of the telemeter and the gun will thereby remain in parallelism and be directed on the target. The motion of the shafting 42 is also transmitted through shafting 56 into the computer C. The handwheel 57 of the computer generates a movement proportional to the vertical deflection and superelevation which is to be applied to the elevating rack 28 to lay the guns to the proper vertical lead with respect to the target. This movement is communicated through the shafting 58 and the differential 55 to the elevating pinion 29.

By virtue of the direct application of the lateral and vertical deflections or lead angles to the traversing and elevating parts of the gun mount the sighting telescopes 43 and 44 on the telemeter B are not moved off the target and the task of the observer who maintains stereoscopic contact is simplified. This arrangement whereby the hand-wheels 49 and 57 of the computer directly actuate the gun mount can only be employed when the weight of the gun mount is not excessive.

With the heavier gun mounts an alternate method, shown schematically in Fig. 8, is adopted. According to this method, the lateral and vertical deflections are communicated on the telemeter B to move the lateral and vertical lines of sight off of the target. The operation of restoring the lines of sight onto the target will therefore cause displacements corresponding to the deflections to be applied to the gun mount.

In this alternate method, the azimuth rate shaft 40 leads directly to the traversing pinion 23 by means of the shaft 59 and to the computer through differential 60. The lateral deflection shaft 50 from the computer leads directly through shaft 53 to the traversing plate 35 of the telemeter to move the latter relatively to the gun mount through the prescribed horizontal lead angle. The movement of the lateral deflection shaft 50 is transmitted by means of the shaft 61 to the differential 60 where it causes that part of the rate shaft 40 leading to the computer to have a movement which is reverse to the normal movement receiver through the handwheel 39. Since the telemeter has been moved relatively to the gun mount through the lateral deflection shaft 50 and 53, the operator of the handwheel 39 moves his telescope, which is on the telemeter, back on the target by traversing the gun mount. This adjusting movement is not a measure of the angular rate of the target and is not required in the computer. Consequently, it is neutralized or compensated for by the corresponding measure lateral deflection transmitted to it through the shaft 61.

Similarly the elevation rate shaft 42 leads to the elevating pinion 29 through shaft 62 and to differential 63 from which a shaft 64 drives a shaft 65. The shaft 65 leads into the computer and also to the elevating rack 36 of the telemeter. The gun mount and the telemeter are thus maintained in parallelism and are moved in accordance with the angular height to the target.

The shaft 58 from the computer which affords a measure of the vertical deflection plus superelevation leads to the differential 63 and thence through shaft 64 to shaft 65 which, as just explained, leads to the computer and telemeter. Accordingly, both of these units receive the movement of vertical deflection plus superelevation and the telemeter is moved off of the target through the corresponding vertical lead angle. The operator of the handwheel 41 in resighting on the target through his telescope 44, which is on the telemeter, actuates the elevation rate shaft 42 and as has been seen any movement of this shaft is transmitted to the elevating pinion 29 of the gun mount and to the computer. The movement to the computer is neutralized by the vertical deflection movement which was reintroduced into the computers.

All of the foregoing movements flow continuously through the telemeter and the guns are always laid to the future position of the target. The only element which is not automatically recorded or transmitted is the value of the altitude and this is supplied to the computer through a speaking tube connecting it with the telemeter.

By using tracer bullets whose trajectory is discernible, the stereoscopic observer is in a position to adjust the firing by observation. By operating the independent controls 37 and 38 respectively provided in the elevating and traversing mechanism of the telemeter the stereoscopic observer can arbitrarily displace the instrument and with it the telescopes 43 and 44. The telescope observers in resighting on the target by actuating the handwheels 39 and 41 and the associated systems of shafting, alter the lateral and vertical lead of the guns and places the trajectory of the bullets on the target. The arbitrary adjustment instituted by the stereoscopic observer may be performed by means of one estimated movement or through successive approximations.

Such adjustment of fire by observation may be employed independently of the computer and is particularly applicable under those circumstances where the target is diving or approaches unobserved within a short distance of the gun.

Wherever the words "gun" and "telemeter" appear in the specifications and claims, it is to be understood that guns and a stereoscope or coincidence alti-telemeter are also contemplated.

In Figs. 9 to 12 the arrangement of the physical embodiment of the gearing represented schematically in Fig. 7 is shown in connection with the gun mount, corresponding parts being similarly designated.

I claim:

1. In a fire control system, a gun mounted for movement in azimuth and elevation, a telemeter normally parallel to the axes of bore of the gun and movable with the gun in azimuth, azimuth and elevation mechanism for moving the telemeter relative to the gun, sighting means on the telemeter, sighting controls for moving the gun and telemeter in unison, a computer receiving the movement of the sighting controls and determining total lateral and vertical deflections, means for transmitting the deflection corrections directly from the computer to the gun, means for transmitting the lateral deflection correction in reverse to the telemeter, and independent controls for the azimuth and elevation mechanism of the telemeter.

2. In a fire control system, a gun mounted for movement in azimuth and elevation, a telemeter normally parallel to the axes of bore of the gun and movable with the gun in azimuth, azimuth mechanism for moving the telemeter relative to the gun, sighting means on the telemeter, sighting controls for moving the gun and telemeter in unison, a computer receiving the movement of the sighting controls and determining total lateral and vertical deflections, means for transmitting the deflection corrections directly from the computer to the gun, and means for transmitting the lateral deflection correction in reverse to the telemeter.

3. In combination with a gun, a telemeter normally parallel to the axes of bore of the gun, sighting means on the telemeter, sighting controls for moving the gun and telemeter in unison, a computer receiving said movements and generating a movement proportional to deflection corrections, means for directly applying the deflection corrections to the gun, and means for independently moving the telemeter.

4. In combination with a gun, a telemeter normally parallel to the axes of bore of the gun, sighting means on the telemeter, sighting controls for moving the gun and telemeter in unison, a computer receiving said movements and generating a movement proportional to deflection corrections, and means for directly applying the deflection corrections to the gun.

5. In combination with a gun, a telemeter normally parallel to the axes of bore of the gun, sighting means on the telemeter, sighting controls for moving the gun and telemeter in unison, a computer receiving said movements and generating a movement proportional to deflection corrections, means for applying the deflection corrections to the telemeter and back to the computer, and means for arbitrarily moving the telemeter relative to the gun.

6. In combination with a gun, a telemeter normally parallel to the axes of bore of the gun, sighting means on the telemeter, sighting controls for moving the gun and telemeter in unison, a computer receiving said movements and generating a movement proportional to deflection corrections, and means for applying the deflection corrections to the telemeter and back to the computer.

7. In combination with a gun, a stereoscopic telemeter normally parallel to the axes of bore of the gun, sighting means on the telemeter, sighting controls moving the gun and telemeter in unison and means for displacing the telemeter from parallelism with the axes of bore of the gun.

GLADEON M. BARNES.